Patented Feb. 8, 1944

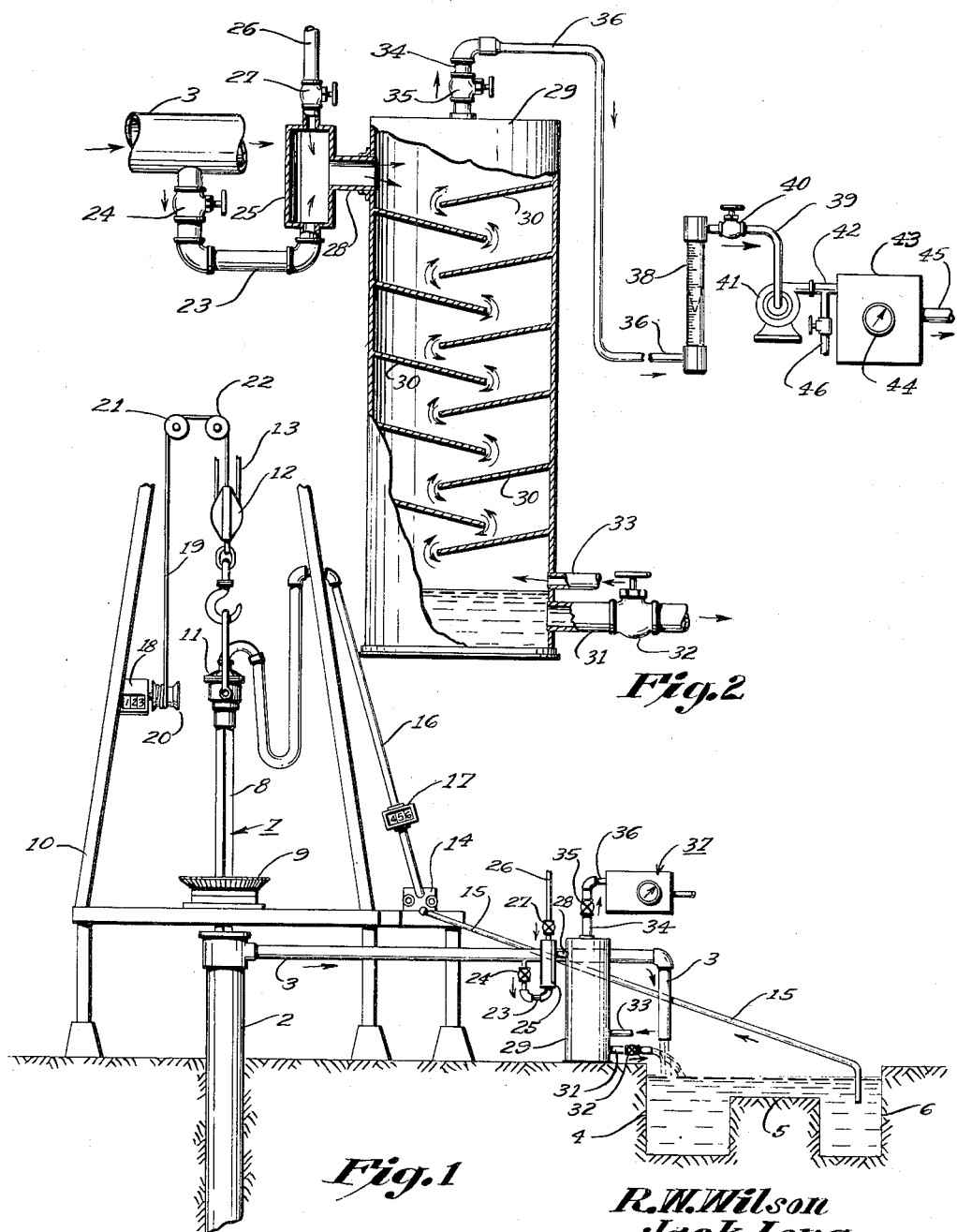

2,341,169

UNITED STATES PATENT OFFICE 2,341,169

METHOD AND APPARATUS FOR DETECTING GAS IN WELL DRILLING FLUIDS

Ralph W. Wilson, Houston, and Alfred Long, Jr., Wichita Falls, Tex., and Martin T. Randolph, Tulsa, Okla., assignors to National Lead Company, a corporation of New Jersey Application December 30, 1940, Serial No. 372,364

6 Claims. (Cl. 73—51)

This invention relates to methods and apparatus for the detection of gas in well drilling muds during the drilling of wells by the rotary method, wherein a stream of mud-laden drilling fluid is circulated through the well during the drilling operations, whereby the gas-bearing formations from which said gas came may be located.

In accordance with conventional rotary drilling practice, particularly as practiced in the method embodying this invention, a mud fluid, consisting generally of a suspension of clay solids in water, is circulated through the well during the drilling thereof for the purpose of washing drill cuttings from the well, plastering the wall of the well bore, keeping the bit clean, etc. Ordinarily, the specific gravity of the drilling fluid is so controlled, as by adding high specific gravity weighting materials thereto, such as barytes, iron oxide, etc., that the hydrostatic head of the drilling fluid column is maintained substantially in excess of the pressures of any of the cognate fluids, such as gas, oil, and water, contained in any of the formations traversed by the drill. Also, a gel-component, such as colloidal clay like bentonite, is added to the mud fluid to maintain the solid components of the mud fluid, that is, the clay and weighting materials, in more or less permanent suspension, and to aid in quickly sealing up and plastering the formations traversed by the drill. The resulting drilling fluid is generally a viscous fluid of about the consistency of heavy lubricating oil. As a result of the excess head of the column of drilling fluid and of its wall sealing and plastering properties, when a fluid bearing formation, such as a gas-bearing stratum, is pierced by the drill, the excess head of the drilling fluid column and its sealing properties will act promptly to prevent the inflow of the gas into the well bore and into the column of mud fluid, and to effectively seal up such stratum. In fact, in modern rotary drilling practice, great care is exercised in carefully controlling the properties of the mud fluid so that no such inflows will occur, since otherwise, there is great danger that the high pressure cognate fluids will enter the well bore in sufficient quantities to cause disastrous "blow-outs," with consequent great hazard to the well and to life and property in the vicinity of the well.

Hayward Patent No. 2,214,674, dated September 10, 1940, disclosed that under the above-described conditions of modern rotary drilling practice, wherein the inflow of cognate fluids from the traversed formations is prevented, certain exceedingly minute amounts of the cognate fluids will be present in the circulating fluid, and that such minute amounts of the cognate fluids can be detected in the drilling fluid returns leaving the well, and that the location of the fluid-bearing strata responsible therefor can be determined by suitable methods disclosed in that patent for tracing the flow of successive increments of the mud fluid through the well and identifying the emerging increments with the corresponding strata responsible for the presence of the cognate fluids in the respective increments.

These minute quantities of the cognate fluids, such as gas, present in the mud fluid, are those very small quantities contained in the cylindrical core of the fluid-bearing strata which is continuously cut from the strata, ground up by the bit, and dispersed in the stream of mud fluid continuously flowing past the bit, as distinguished from the fluids flowing into the well from the surrounding strata. The small quantities of gas thus introduced into the drilling fluid will become widely dispersed therein in the form of relatively minute globules, or as thin films on the surfaces of the particles of solid matter contained in the drilling fluid, or in solution to some extent in the aqueous phase of the drilling fluid, and an effective method of separation and detection of these minute amounts of gas becomes very necessary to aid in accurately locating the gas-bearing formations.

The present invention employs the basic concepts of the Hayward invention for correlating the successive portions of the drilling fluid returns with the sub-surface strata, but is directed particularly to an improved method and apparatus for separating and detecting the minute amounts of gas in the drilling fluids during drilling and for determining the location of the strata responsible therefor.

Generally stated and in accordance with the illustrative embodiments of this invention, the flow of drilling fluid is suitably traced through the well in order to correlate each portion of the emerging fluid with the corresponding sub-surface strata; a minor portion of the emerging fluid is continuously diverted from the main stream thereof and caused to flow through a separating zone in intimate contact with an introduced stream of air whereby any minute amounts of gas which may be occluded in the drilling fluid are caused to separate from the drilling fluid; a constant volume of the separated gaseous fluid is withdrawn from the separating zone substantially as rapidly as it is evolved from the drilling fluid, and is continuously analyzed for gas, to thereby detect the presence of gas in the drilling fluid and the amount thereof. Water or a suitable chemical gas-releasing agent may be added to the diverted portion of the drilling fluid stream to assist the contacting air in effecting release of any occluded gas from the drilling fluid.

The step of subjecting only a minor portion of the drilling fluid stream to analysis for gas is particularly useful, for very often the gas will be tightly occluded in the mud fluid because of its viscosity, or by reason of the gel-component therein or will be in the fluid in the form of an emulsion, or in solution, and it becomes necessary to dilute the mud with water or treat it with viscosity-reducing or emulsion-breaking chemicals to effect release of sufficient gas for analysis. To so treat the entire stream of mud fluid would ordinarily be both prohibitive in cost, and in many cases highly detrimental to the mud fluid, since treatment would often destroy the necessary gel-component of the mud and thereby render the entire body of the mud fluid practically valueless and ineffective for further drilling. By the improved method and apparatus contemplated by this invention, such an undesirable result is avoided and separation and detection of the gas and location of the gas bearing strata is effectively accomplished.

The various objects and advantages of this novel invention will be more readily understood from the following detailed description, when read in conjunction with the accompanying drawing, which illustrates, more or less diagrammatically, apparatus suitable for practicing the improved methods of this invention. It will be understood, however, that this invention is not limited to any particular apparatus or mere details of steps, but that various changes may be made in details but within the scope of the appended claims, without departing from the spirit of this invention.

In the drawing:

Fig. 1 illustrates an arrangement of apparatus in accordance with one modification of this invention suitable for the practice thereof, and Fig. 2 illustrates in greater detail a portion of the apparatus illustrated generally in Fig. 1.

Referring to the drawing and to Fig. 1 in particular, the numeral 2 designates the upper end of the usual surface casing lining a well bore being drilled in accordance with modern conventional rotary drilling methods, by the employment of a circulating hydraulic fluid, such as a suspension of clay solids in water, generally of the composition as above described, and conventionally termed rotary mud, drilling fluid or mud-laden fluid. The upper end of casing 2 is provided with a side outlet pipe 3 which discharges into the usual mud settling pit 4 where the solid cuttings brought to the surface from the bottom of the well by the drilling fluid are settled out. The settled mud fluid flows through an over-flow ditch 5 to a suction pit 6 from which the cuttings free mud fluid is withdrawn for return to the well. Extending into the well bore through casing 2 is a conventional hollow drilling string, designated generally by the numeral 7, and having at its lower end the usual drill bit (not shown). A conventional Kelly joint 8 forms the upper end of the drilling string and extends through a rotary table 9 conventionally mounted on the floor of derrick 10. Rotation of rotary table 9 rotates Kelly joint 8 in the usual way to cause rotation of the drilling string and of the bit to produce drilling of the strata encountered. The upper end of Kelly joint 8 is connected to the usual rotary hose swivel 11, and the entire drilling string is suspended in the usual manner from a travelling block 12 which is adapted to be raised and lowered in the derrick by means of cables 13, all in accordance with common rotary drilling practice.

A mud pump 14 has its suction pipe 15, which leads to suction pit 6, and a discharge pipe 16 which communicates with the bore of the hollow drilling string 7 through swivel 11. A fluid meter 17 is positioned in pipe 16 and is adapted to measure the volumetric flow of the mud fluid pumped from suction pit 6 by pump 14 through pipes 15 and 16 to the drilling string. Fluid meter 17 may be of any conventional type adapted to measure units of drilling fluid passing through the well.

The depth of the well may be measured at all times by any conventional method and this is commonly done by adding together the measurements of the lengths of all joints of drill pipe in the well, and by suitably marking the Kelly joint to determine how much of its length has descended into the well. However, the depth measurements may be conveniently obtained by suitable mechanical or automatic measuring devices such as that described in Hayward Patent No. 2,166,212, dated July 18, 1939. A suitable mechanical depth measuring device is diagrammatically represented in the drawing by a depth meter 18 operated by means of a measuring line 19 passing over a measuring pulley 20 and leading over pulleys 21 and 22 to the traveling block 12, the measurement of the depth of the well or the length of drill pipe in the well being obtained thereby from the downward movements of the traveling block as it follows the downward movements of the drilling string in the well.

A branch pipe 23, having a valve 24, is connected into side outlet pipe 3 and leads to the bottom of a hollow mixing chamber 25, into the upper end of which is connected a pipe 26, having a valve 27 interposed therein. From the side of mixing chamber 25 a conduit 28 leads into the upper portion of a vertically positioned, elongated separating chamber 29, fitted internally with a plurality of vertically spaced, downwardly sloping baffle plates 30 (Fig. 2). From the lower end of separating chamber 29 a discharge pipe 31, in which is mounted a valve 32, leads over the mouth of settling pit 4. An air inlet pipe 33 communicates with the interior of separating chamber 29 at a point above and adjacent to discharge pipe 31. An outlet pipe 34, fitted with a valve 35, is in communication with the upper portion of separating chamber 29 above the point of connection thereto of conduit 28, and connects to a suction tube 36 which leads to a suitable gas detection and analysis apparatus, designated generally in Fig. 1 by the numeral 37. Fig. 2 illustrates the gas detection and analysis apparatus in somewhat greater detail. Suction tube 36 leads to the lower inlet end of a flow meter 38 which may be of any suitable or conventional construction. A convenient form of flow meter is illustrated in Fig. 2 and is a commercial type known as the "Rotameter," manufactured by Fischer and Porter, Philadelphia, Pa., and is found to be well adapted for use in this apparatus, for measuring the volume of gaseous fluid withdrawn from separating chamber 29. A pipe 39, in which is mounted a regulating valve 40, leads from the upper outlet end of flow meter 38 to the suction of a compressor 41 from the discharge of which a pipe 42 leads to a gas analyzer 43, which is preferably of the conventional electric hot filament type commonly employed for analyzing air-gas mixtures for the presence and amount of combustible gases such as the hydrocarbon gases commonly encountered in drilling oil or gas wells. Analyzer 43 is provided with the usual register 44 for indicating the percentage of gas in the mixture passing through the analyzer, which is also provided with a discharge pipe 45 for venting the products of analysis from the instrument. A valved branch pipe 46 is connected into pipe 42 at a point between compressor 41 and analyzer 43.

Detection of gas and location of the gas-bearing formation during drilling of an oil or gas well is accomplished by means of the above described apparatus in the following manner:

Rotary drilling is conducted in the conventional manner, whereby the drilling string 7 is rotated to produce the cutting action of the drill bit at the bottom of the well, and a stream of drilling fluid, of the character described above, having a specific gravity such as to provide a fluid column pressure in the well in excess of the head in any stratum encountered by the drill and containing a gel-component, is circulated through the well. The drilling fluid is drawn from suction pit 6 through pipe 15 by pump 14 and is discharged through pipe 16 and swivel 11 into the interior of the drilling string. Upon reaching the bit at the bottom of the well, the mud is discharged through the usual openings in the bit adjacent the bottom of the well into the annular space between the drilling string and the wall of the well bore. As the fluid is discharged into the annular space, the bit disperses therein the ground-up particles of the segment of the stratum which the bit is currently cutting, together with any cognate fluids, such as gas or oil, present in the stratum. The drilling fluid containing the dispersed materials then flows upwardly through the annular space to the top of the well where it is discharged through side outlet pipe 3 and flows toward settling pit 4. The flow of the drilling fluid through the well is continuously followed and each increment of the emerging fluid is related to the stratum corresponding thereto, that is, to the stratum responsible for any cognate fluid which might be present in that increment, by cooperatively employing fluid meter 17 and depth meter 18 in order to measure the depth of the well in synchronism with the rise of each increment of the drilling fluid to the top of the well in the manner disclosed in Hayward Patent No. 2,214,674, referred to above. In this way each increment of the drilling fluid flowing through pipe 3 towards settling pit 4 is continuously identified with the depth position of the corresponding stratum.

As the drilling fluid flows through pipe 3, a minor portion of the fluid is continuously diverted from the main stream in pipe 3 into pipe 23 by opening valve 24. The minor portion, which is ordinarily about one percent of the total fluid, but may be more or less, then flows through mixing chamber 25, where, if found necessary, a gas-releasing treating agent, such as water, viscosity-reducing or emulsion-breaking chemicals of a character well known to those skilled in this art, may be added to the minor portion of the drilling fluid by introduction through pipe 26 under control of valve 27, by which the quantity of treating agent so added may be regulated. The drilling fluid, or mixture of drilling fluid and treating agents, then flows through conduit 28 into the upper portion of separating chamber 29. Therein the drilling fluid flows downwardly in a tortuous path over baffle plates 30 to the lower portion of the separating chamber from which it eventually flows, generally by gravity, through pipe 31 and valve 32 into settling pit 4 where it is remixed with the main stream of the drilling fluid discharging from pipe 3. Since the side stream of drilling fluid sent through separator 29 is only about one percent of the total volume of drilling fluid it cannot have any undesirable effect upon the entire body of drilling fluid when re-mixed therewith even though the side stream contains some treating agents. This is particularly true since the amount of treating agent which is normally added will often be less than one percent of the amount of the side stream. A slight suction is maintained in separating chamber 29 by means of the suction of compressor 41 and this acts to draw air into the separating chamber through pipe 33 which is open to the atmosphere. The entering air flows upwardly through the separating chamber in intimate counter-current contact with the down-flowing stream of drilling fluid and the intimate contact of the air with the down-flowing drilling fluid aerates the fluid and expels any gas which has been occluded in the fluid. In some cases, only aeration in the manner described is necessary to effect release of the gas from the drilling fluid, while in other cases, the combination of aeration and treatment with one or more of the above-mentioned treating agents will accomplish this result. By manipulation of valve 40 in pipe 39, the suction applied to separating chamber 29 through flow meter 38 is such as to cause the compressor 41, cooperating with flow meter 38, to withdraw a constant volume of the gaseous fluid, comprising the mixture of gas and air, from separating chamber 29, and the withdrawn mixture is metered by flow meter 38. The volume of gaseous fluid so withdrawn is ordinarily adjusted to such as will cause removal of the gas from chamber 29 substantially as rapidly as it is evolved from each increment of the drilling fluid entering the chamber. Since the volume of air-gas mixture withdrawn is constant, then, as the volume of gas evolving from the drilling fluid changes, the volume of air in the mixture withdrawn will change proportionally, since the pressure conditions in chamber 29 are held constant. The withdrawn air-gas mixture is then discharged by compressor 41 through pipe 42 and the detector-analyzer 43 which indicates on register 44 the percentage of gas in the mixture. Register 44 will thus continuously indicate the rate of evolution of gas from the drilling fluid. Of course, when no gas is present in the drilling fluid, no indication will appear on register 44 and the absence of gas will thus be indicated. The indication on register 44 of any proportion of gas in the mixture serves to detect the presence of gas in the drilling fluid and the changing percentages indicate the rate of evolution of gas from the drilling fluid. Since, as noted, each increment of the drilling fluid entering separating chamber 29 has already been identified with its corresponding source stratum, the analysis of the air-gas mixture will determine when a gas-bearing formation has been penetrated, and together with the corresponding depth data, will serve to locate the depth position of such formations. It will be understood, of course, that the air introduced into separating chamber 29 should be gas-free at all times.

Under the conditions of modern drilling, as set forth herein, where the fluid column pressure is at all times maintained in excess of the formation pressures, and since, ordinarily, from about 50 to 150 or more barrels of drilling fluid are circulated through the well per foot of formation drilled, the volume of gas carried by any increment of the drilling fluid will necessarily be quite small, often as little as 0.001 cubic foot per minute being evolved from the fluid. To make certain that the evolving gas is transported to the analyzer substantially as rapidly as it evolves from the drilling fluid, so that the analysis of each portion of the gas may be accurately related to its corresponding increment of the drilling fluid, the total volume of gaseous fluid withdrawn from separating chamber 29 is so regulated by adjustment of valve 40 that the volume of air entering the chamber will be sufficient to continuously purge the chamber and to carry the evolving gas directly to the analyzer without substantial lag or delay between the evolution and the analysis. As an example, twenty cubic feet per minute of the air-gas mixture has been found to be a convenient volume to be continuously withdrawn from separator 29. The volume thus withdrawn will vary, of course, with the size of separating chamber, the volume of gas ordinarily evolved and other factors which will be apparent to those skilled in this art. It will also be understood that the entire volume of the air-gas mixture withdrawn from separating chamber 29 is not passed through the analyzer 43, since such analyzers are generally operative only on small volumes. The bulk of the air-gas mixture is, therefore, generally by-passed around the analyzer through valved pipe 46, and only enough for purposes of analysis is sent to the analyzer through pipe 42.

What we claim and desire to secure by Letters Patent is:

1. The method of detecting gas in drilling mud returns from a well during drilling, comprising, flowing drilling mud returns from the well through a separating chamber, introducing a counter-current of air into said separating chamber into intimate contact with said drilling mud, withdrawing the resulting gaseous fluid from said separating chamber, and analyzing said fluid for gas.

2. The method of detecting gas in the drilling mud returns from a well during drilling, comprising, flowing the drilling mud returns from the well, diverting a minor portion of the returns from the main stream thereof, flowing said minor portion through a separating chamber, introducing a counter-current of air into said separating chamber into intimate contact with said minor portion of the drilling mud returns, withdrawing the resulting gaseous fluid from said separating chamber, and analyzing the fluid for gas.

3. The method of detecting gas which has become dilutedly occluded in the circulating drilling fluid employed in the drilling of an oil or gas well by the drilling of a stratum while the fluid column is maintained at a head exceeding the head of the stratum, comprising, flowing drilling fluid returns from the top of the well into intimate contact with a counter-current of air to thereby effect release of occluded gas therefrom, separating the resulting air-gas mixture from said fluid, and analyzing said mixture for gas.

4. Apparatus for detecting gas in the drilling fluid returns from a well during drilling, comprising, in combination with a discharge pipe for discharging drilling fluid returns from the top of a well, a mixing chamber, a branch pipe connecting said discharge pipe to said mixing chamber, a second pipe connected to said mixing chamber, a separator, a conduit connecting said mixing chamber to said separator, an air inlet pipe for said separator, liquid-gas contacting means in said separator interposed between said conduit and said air inlet pipe, a liquid discharge pipe from said separator, a suction pipe connected to said separator, a flow meter interposed in said suction pipe, a gas analyzer connected to said suction pipe, and a compressor operatively associated with said suction pipe for producing a flow of gaseous fluid through said suction pipe from said separator and through said flow meter and said gas analyzer.

5. The method of detecting gas in the drilling mud returns from a well during drilling, comprising, flowing the drilling mud returns from the well, after admixture therewith of a viscosity-reducing agent, through a separating chamber, introducing a counter-current of air into said separating chamber into intimate contact with said drilling mud, withdrawing the resulting gaseous fluid from said separating chamber and analyzing the gaseous fluid for gas.

6. The method of detecting gas in the drilling mud returns from a well during drilling, comprising, flowing the drilling mud returns from the well through a separating chamber, introducing a counter-current of air into said separating chamber into intimate contact with said drilling mud, maintaining constant suction in said separating chamber to thereby withdraw from said separating chamber a constant volume of said gaseous fluid substantially as rapidly as it evolves from said drilling fluid, and analyzing the withdrawn gaseous fluid for gas.

RALPH W. WILSON.
ALFRED LONG, Jr.
MARTIN T. RANDOLPH.